US012620515B2

(12) United States Patent
Herrmann et al.

(10) Patent No.: US 12,620,515 B2
(45) Date of Patent: May 5, 2026

(54) ELECTROMAGNET AND METHOD FOR MOUNTING AN ELECTROMAGNET

(71) Applicant: PIERBURG GMBH, Neuss (DE)

(72) Inventors: Berthold Herrmann, Neuss (DE); Halim Celik, Huerth (DE)

(73) Assignee: PIERBURG GMBH, Neuss (DE)

( * ) Notice: Subject to any disclaimer, the term of this patent is extended or adjusted under 35 U.S.C. 154(b) by 345 days.

(21) Appl. No.: 18/008,972

(22) PCT Filed: Jul. 1, 2021

(86) PCT No.: PCT/EP2021/068170
§ 371 (c)(1),
(2) Date: Dec. 8, 2022

(87) PCT Pub. No.: WO2022/003102
PCT Pub. Date: Jan. 6, 2022

(65) Prior Publication Data

US 2023/0274868 A1 Aug. 31, 2023

(30) Foreign Application Priority Data

Jul. 2, 2020 (DE) .................... 10 2020 117 501.9

(51) Int. Cl.
*H01F 7/121* (2006.01)
*H01F 7/08* (2006.01)
*H01F 7/16* (2006.01)

(52) U.S. Cl.
CPC ............... *H01F 7/121* (2013.01); *H01F 7/08* (2013.01); *H01F 7/1607* (2013.01)

(58) Field of Classification Search
CPC .......... H01F 7/121; H01F 7/08; H01F 7/1607; H01F 2007/062; H01F 7/126; H01F 7/127
USPC .......................................................... 335/270
See application file for complete search history.

(56) References Cited

U.S. PATENT DOCUMENTS 5,261,637 A * 11/1993 Curnow .............. F16K 31/0655 335/262
5,467,962 A * 11/1995 Bircann ................. F02M 26/72 335/262
5,947,092 A * 9/1999 Hussey ................. H01F 7/1607 123/568.26
6,064,289 A * 5/2000 Wieloch ............... H01H 50/546 335/10
6,144,275 A 11/2000 Hirata et al.
2003/0080305 A1 5/2003 Schafer
2005/0184841 A1 8/2005 Ryuen et al.
2007/0062588 A1 3/2007 Golovatai-Schmidt et al.
2016/0017991 A1 1/2016 Boban et al.
(Continued)

FOREIGN PATENT DOCUMENTS

DE 1 539 731 A1 11/1970
DE 103 59 364 A1 7/2005
DE 10 2014 109 097 A1 12/2015
(Continued)

*Primary Examiner* — Shawki S Ismail
*Assistant Examiner* — Lisa N Homza
(74) *Attorney, Agent, or Firm* — Norman B. Thot

(57) ABSTRACT

An electromagnet includes a pre-assembly unit having a guide element and a coil, an armature which is arranged translationally displaceable in the guide element, and a core having an axially extending annular protrusion into which the pre-assembly unit is inserted.

19 Claims, 2 Drawing Sheets

(56) References Cited

U.S. PATENT DOCUMENTS

| | | | | |
|---|---|---|---|---|
| 2020/0126702 A1* | 4/2020 | Deland | ..................... | H01F 3/10 |

FOREIGN PATENT DOCUMENTS

| | | | | | |
|---|---|---|---|---|---|
| DE | 102014224223 | A1 * | 6/2016 | ......... | F16K 31/0675 |
| DE | 10 2018 219 428 | A1 | 5/2020 | | |
| EP | 0 856 857 | A2 | 8/1998 | | |
| EP | 0 971 375 | A2 | 1/2000 | | |
| EP | 0 701 055 | B1 | 5/2000 | | |
| EP | 2 966 329 | A1 | 1/2016 | | |
| JP | H04-103606 | U | 9/1992 | | |
| JP | 2004-128317 | A | 4/2004 | | |
| WO | WO-2018004538 | A2 * | 1/2018 | ........... | H01F 7/1607 |

* cited by examiner

ELECTROMAGNET AND METHOD FOR MOUNTING AN ELECTROMAGNET

CROSS REFERENCE TO PRIOR APPLICATIONS

This application is a U.S. National Phase application under 35 U.S.C. § 371 of International Application No. PCT/EP2021/068170, filed on Jul. 1, 2021 and which claims benefit to German Patent Application No. 10 2020 117 501.9, filed on Jul. 2, 2020. The International Application was published in German on Jan. 6, 2022 as WO 2022/003102 A1 under PCT Article 21(2).

FIELD

The present invention relates to an electromagnet with an armature, which is arranged translationally displaceable in a guide element, a core and a coil. The present invention also relates to a method for mounting an electromagnet.

BACKGROUND

Electromagnets, in particular those used for actuating valves, are generally known and are described in a large number of applications. The magnetic attraction force generated by a current flow in a coil is used to pull an armature in the direction of a core, wherein a magnetic circuit is closed by the core, the armature, a yoke, and any magnetic return elements present.

Such an electromagnet is described, for example, in EP 2 966 329 A1. The electromagnet comprises a housing in which a coil carrier with a wound coil is arranged, wherein a return element is provided at each of the axial ends of the coil carrier. The coil carrier radially surrounds a guide pot in which a translationally moving armature and a pressed-in core are arranged.

The disadvantage of such an electromagnet is that the electromagnet comprises a relatively large number of individual components which must be assembled individually and require many individual assembly steps.

SUMMARY

An aspect of the present invention is to provide an electromagnet with a reduced number of individual components and to simplify the assembly thereof.

In an embodiment, the present invention provides an electromagnet which includes a pre-assembly unit comprising a guide element and a coil, an armature which is arranged translationally displaceable in the guide element, and a core comprising an axially extending annular protrusion into which the pre-assembly unit is inserted.

BRIEF DESCRIPTION OF THE DRAWINGS

The present invention is described in greater detail below on the basis of embodiments and of the drawings in which.

DETAILED DESCRIPTION

Figure 1:
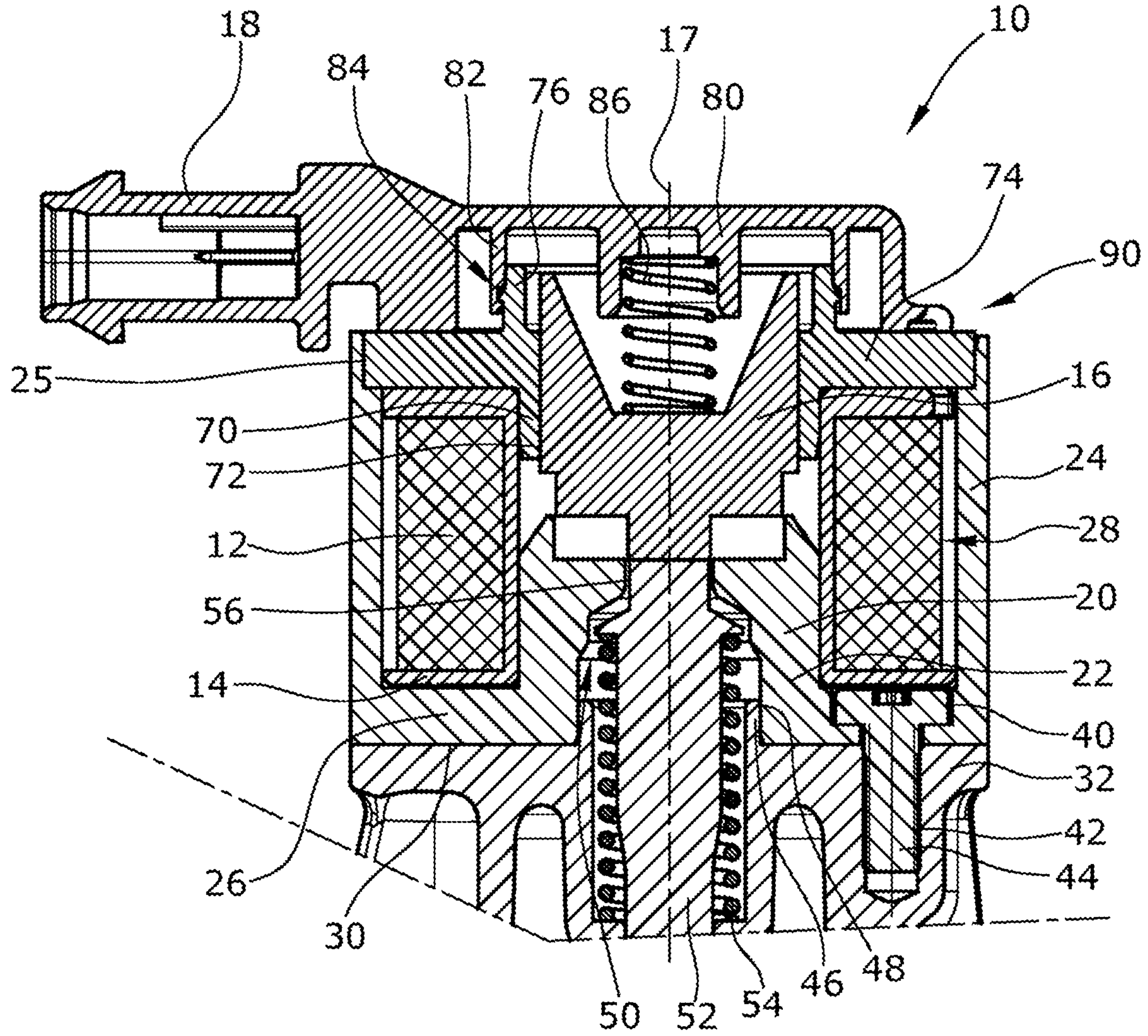
FIG. 1 shows a cross-section of a first version of an electromagnet configured according to the present invention.

The assembly of the electromagnet can be simplified by providing a pre-assembly unit comprising the guide element and the coil, wherein the core comprises an axially extending annular protrusion into which the pre-assembly unit is inserted. The metallic guide element is used as a carrier for the pre-assembly unit, wherein the coil with its coil carrier is attached to the guide element in a pre-assembly step. The pre-assembly unit is thereby assembled in a simple and cost-effective manner. In the final assembly step, the pre-assembly unit is connected to the core. For this purpose, the core comprises an annular protrusion into which the pre-assembly unit is inserted and fixed to the annular protrusion.

Such a design of the electromagnet reduces the manufacturing and the assembly effort.

The number of individual components of the electromagnet is also reduced in that the annular protrusion of the core radially surrounds a major portion of the mounting assembly, thereby forming the major portion of the body of the electromagnet.

The pre-assembly unit can, for example, comprise a cover and a plug electrically connected to the coil, wherein the cover is attached, for example, adhesively bonded, to the guide member. The cover, together with the annular protrusion of the core, forms the housing of the electromagnet, so that no separate housing is required. The assembly effort and the manufacturing effort can thus be reduced in that no separate housing must be manufactured and assembled.

The connector can, for example, be configured integrally with the cover, thereby reducing the manufacturing effort. The cover together with the annular protrusion of the core forms the housing of the electromagnet, so that no separate housing is required. The assembly effort and the manufacturing effort can thus be reduced in that no separate housing needs to be manufactured and assembled.

In an embodiment, the pre-assembly unit can, for example, comprise the armature. The pre-assembly unit can, for example, comprise a spring, wherein the spring is arranged between the cover and the armature. This further simplifies the assembly of the electromagnet.

The inner peripheral surface of the annular protrusion can, for example, comprise an annular shoulder, wherein the guide member is in axial contact with the annular shoulder. The pre-assembly unit is attached to the annular protrusion of the core via the guide element, wherein the annular protrusion comprises the annular shoulder at its end facing the pre-assembly unit, against which the guide element is in axial contact. This simplifies the assembly of the pre-assembly unit in that the end position of the pre-assembly unit is predefined by the annular protrusion, wherein the pre-assembly unit must be inserted into the annular protrusion until the guide element is in contact with the annular protrusion. This can prevent incorrect assembly. The assembly of the pre-assembly unit can alternatively be carried out with the aid of force-displacement monitoring, wherein an upper edge of the annular protrusion of the core is used as a reference for the press-in depth.

The pre-assembly unit can, for example, be insertable into the core in all positions rotated about an axial axis. The component that can be connected to the annular protrusion of the core, for example, the radial fastening protrusion of the guide element, and the annular protrusion of the core comprise a rotationally symmetrical contour so that the pre-assembly unit can be inserted into and connected to the annular protrusion in any rotational position. The radially aligned connector can therefore be aligned in the direction of rotation as required, adapted to the installation position.

In an embodiment, the guide element can, for example, comprise a sleeve and a fastening protrusion extending radially from the outer circumferential surface of the sleeve, wherein the fastening protrusion is attached to the annular protrusion of the core. The sleeve is used with its inner circumferential surface for guiding the axially movable armature and with its outer circumferential surface for receiving the coil, wherein the coil is fitted onto the guide element at a first axial end of the sleeve. The radially extending fastening protrusion is used as an axial stop for the axially fitted coil and for fastening the pre-assembly unit to the annular protrusion of the core. The radial fastening protrusion of the guide element projects radially beyond the coil and is fastened to the annular protrusion of the core with the section projecting radially beyond the coil. The pre-assembly unit is thus fastened to the core exclusively by the guide element.

The guide element can, for example, comprise a nickel coating or zinc-nickel coating on its guide surface and/or the armature can, for example, comprise a zinc-nickel coating on its outer peripheral surface facing the guide element radially. This reduces the friction between the guide surface of the guide element and the outer circumferential surface of the armature during an adjusting movement of the armature.

The cover can, for example, be interlockingly and/or adhesively attached to the guide element, thereby simplifying the attachment of the cover to the guide element. In an embodiment, the guide element can, for example, be interlockingly attached to the cover, wherein the guide element comprises a protrusion extending axially towards the cover and the cover comprises a protrusion extending axially towards the guide element, wherein the protrusions are interlocked with each other. This can simplify the attachment of the cover to the guide element, wherein the assembly of the cover to the guide element is carried out exclusively by inserting or fitting the protrusion provided on the cover into or onto the protrusion provided on the guide element. In the final assembled state of the electromagnet, the annular protrusion of the core and the cover substantially form the housing of the electromagnet.

In an embodiment, the core can, for example, comprise a central cylindrical portion, the annular protrusion, and a connecting portion which is disposed between the cylindrical portion and the annular protrusion, wherein the connecting portion is press-fitted, screw-fitted and/or adhesively bonded to the flow housing. When the connecting section is screwed, the core is in contact with the flow housing via the connecting section and comprises a plurality of through-holes through which the screws are inserted. The flow housing comprises several threaded holes corresponding to the through holes into which the screws are screwed. The through holes are accessible via the annular recess when the pre-assembly unit is dismantled. Such a design of the core allows the core to be screwed to the flow housing in a space-saving manner. When adhesively bonding the connection section to the flow housing, the core is placed on the flow housing, wherein a layer of adhesive is previously applied to a connection surface on the flow housing or on the core. During pressing, the core is pushed onto an axial projection of the flow housing, thereby producing a press connection.

The flow housing can, for example, comprise a centering element on the side facing the core which interacts with a centering recess provided on the core. This can simplify the assembly of the core to the flow housing, wherein the core is radially pre-positioned by inserting the centering element into the opening provided on the core and is subsequently screwed. The centering element can alternatively be formed on the core and the associated opening on the flow housing. When the core is pressed onto the flow housing, the centering element is used as an axial protrusion which forms a press-fit connection with an outer surface with an inner surface of the centering opening.

The present invention also provides a method of assembling an electromagnet, wherein the guide member and the coil and the armature, the plug, the cover and/or the spring are assembled into a pre-assembly unit, wherein the pre-assembly unit is subsequently inserted into the axially extending annular protrusion of the core. In other words, the pre-assembly unit necessarily comprises the guide member and the coil, wherein the armature, the plug, the cover and the spring may optionally be included in the pre-assembly unit in different configurations. The pre-assembly unit may, for example, comprise the guide member, the coil, the cover and the plug. The pre-assembly unit may otherwise comprise the guide member, the coil, the armature and the spring. This simplifies the assembly of the electromagnet.

The core can, for example, be screwed, pressed and/or adhesively bonded to a flow housing. A reliable connection of the core to an adjacent component, in particular to the flow housing, can thereby be established over the lifetime of the electromagnet.

The pre-assembly unit can, for example, be attached to the core via an adhesive connection or a press connection, whereby a reliable connection between the pre-assembly unit and the core can be established. When the pre-assembly unit is attached via a press-fit connection, a pressing tool acts on an axial contact surface of the pre-assembly unit, wherein the available axial contact surface extends over an angular range of at least 270°. Due to the contact surface extending over almost the entire surface, an incorrect assembly, for example, caused by a one-sided load, and thus damage to a component of the electromagnet, can be prevented.

An electromagnet is thereby provided which comprises a reduced number of individual components and which can be assembled more simply and more economically.

Two examples of an electromagnet according to the present invention are shown in the figures and are described below.

The electromagnet 10 according to the present invention comprises a coil 12 which is wound on a coil carrier 14, an armature 16, a core 20, and a guide element 70.

The core 20 is configured as a single piece and comprises a cylindrical central portion 22, an axially extending annular protrusion 24, and a connecting portion 26, wherein the annular protrusion 24 is arranged coaxially with the cylindrical central portion 22, and the connecting portion 26 extends radially from the cylindrical central portion 22 to the annular protrusion 24. The cylindrical central portion 22, the connecting portion 26, and the annular protrusion 24 limit an annular space 28 in which the coil carrier 14, with the coil 12 wound thereon, is arranged. The coil carrier 14 and the coil 12 are disposed radially in sections between the cylindrical central portion 22 and the annular protrusion 24 so that the coil 12 and the coil carrier 14 radially surround the cylindrical central portion 22 of the core 20 and the annular protrusion 24 is radially adjacent to the coil 12.

The core 20 is in contact with a flow housing 32 with a contact surface 30 provided at one axial end and is screwed to the flow housing 32. For the screw connection, a plurality of axially extending through-holes 40 are provided in the connecting portion 26, and the flow housing 32 comprises a plurality of threaded holes 42 corresponding to the through-holes 40, wherein a screw 44 is inserted through each through-hole 40 and is screwed into the threaded hole 42 formed on the flow housing 32. To facilitate the screw connection, the flow housing 32 comprises an axially extending, annular centering element 46 which interacts with a corresponding recess 48 on the core 20.

When attaching the core 20 to the flow housing 32, the annular centering element 46 is inserted into the recess 48, thereby pre-positioning the core 20 in the radial direction. The core 20 is then pre-positioned in the circumferential direction by an auxiliary tool until the through holes 40 overlap with the corresponding threaded holes 42 and the screws 44 can be screwed in.

The cylindrical central portion 22 comprises an axially extending blind hole 50 on the contact surface 30, which forms the recess 48 and in which a valve body 52 interacts. The valve body 52 is axially biased in the direction of the armature 16 by a spring 54 in the form of a helical spring and extends through an aperture 56 formed at the bottom of the blind hole 50, wherein the valve body 52 is in axial contact with the armature 16 with the end face facing the armature 16.

The armature 16 is arranged to be axially movable at an end of the cylindrical central portion 22 of the core 20 opposite the contact surface 30, wherein the armature 16 is guided in translation by a guide element 70.

The guide element 70 includes a sleeve 72 disposed coaxially with the axially movable armature 16, and a mounting protrusion 74 extending radially from an outer peripheral surface of the sleeve 72. A nickel coating is provided on the inner surface of the sleeve 72 and on the outer surface of the armature 16, respectively, thereby reducing friction between the two surfaces during a translational movement of the armature 16. A cover 80 is attached to the end of the guide element 70 facing axially away from the core 20. For this purpose, the guide element 70 comprises an annular protrusion 76 extending axially towards the cover 80, and the cover 80 comprises an annular protrusion 82 extending axially towards the guide element 70, wherein the annular protrusion 82 provided on the cover 80 is fitted onto the annular protrusion 76 provided on the guide element 70 and is latched via latching elements 84. A compression spring 86 is arranged between the cover 80 and the armature 16, so that the armature 16 is axially loaded in the direction of the valve body 52 and against the spring force of the spring 54 by the compression spring 86.

When the electromagnet 10 is not energized, the valve body 52 and the armature 16 are held in a first position by the springs 54, 86, wherein the spring force of the spring 54 is higher than the spring force of the compression spring 86. When current is applied to the coil 12, a magnetic field is created which extends through the cylindrical central portion 22 of the core 20, the connecting portion 26 of the core 20, the annular protrusion 24 of the core 20, the guide element 70, and through the armature 16. This magnetic field causes a magnetic force to act on the armature 16, wherein the sum of the magnetic force acting on the armature 16 and the spring force of the compression spring 86 exceeds the spring force of the spring 54, thereby displacing the armature 16 and the valve body 52 to a second position.

In accordance with the present invention, the coil carrier 14, the coil 12, the guide element 70, the armature 16, and the cover 80 with the plug 18 form a pre-assembly unit 90, wherein the pre-assembly unit 90 is inserted into the annular protrusion 24 of the core 20.

The guide element 70 is used as the support for the pre-assembly unit 90, wherein the cover 80 and the coil carrier 14 are attached to the guide element 70 at opposite axial ends of the guide element 70. The armature 16 is disposed within the guide element 70 and the plug 18 is integrally formed with the cover 80.

The first step when assembling the electromagnet 10 is to screw the core 20 to the flow housing 32. In this process, the core 20 is placed on the flow housing 32 so that the annular centering element 46 provided on the flow housing 32 is arranged in the corresponding recess 48 provided on the core 20. The core 20 is then rotated in the direction of rotation by an auxiliary device until the through-holes 40 overlap with the threaded holes 42. The screws 44 are then inserted over the annular space 28 through the respective through hole 40 and screwed into the threaded holes 42.

Following the attachment of the core 20, the pre-assembly unit 90 is attached to the core 20. In this process, the pre-assembly unit 90 is axially inserted into a space radially limited by the annular protrusion 24, wherein the coil 12 and coil carrier 14 are slid onto the cylindrical central portion 22 of the core 20. The pre-assembly unit 90 is attached by the radially extending mounting protrusion 74 of the guide element 70, wherein the pre-assembly unit 90 is inserted into the annular protrusion 24 of the core 20 until the mounting protrusion 74 is in axial contact with an annular shoulder 25 of the annular protrusion 24. Furthermore, the mounting protrusion 74 is in contact with the inner circumferential surface of the annular protrusion 24 of the core 20 via its outer circumferential surface, wherein the outer diameter of the mounting protrusion 74 is configured to be slightly larger than the inner diameter of the annular protrusion 24 in the region of the annular shoulder 25. The pre-assembly unit 90 is thus attached to the core 20 via a press-fit connection between the guide element 70 and the annular protrusion 24. The annular protrusion 24 and the guide element 70 may alternatively be adhesively bonded together.

The outer peripheral surface of the mounting protrusion 74 and the inner peripheral surface of the annular protrusion 24 comprise a circular cross-section, allowing the pre-assembly unit 90 to be mounted in the core 20 in all positions rotated about the axial axis 17.

Figure 2:
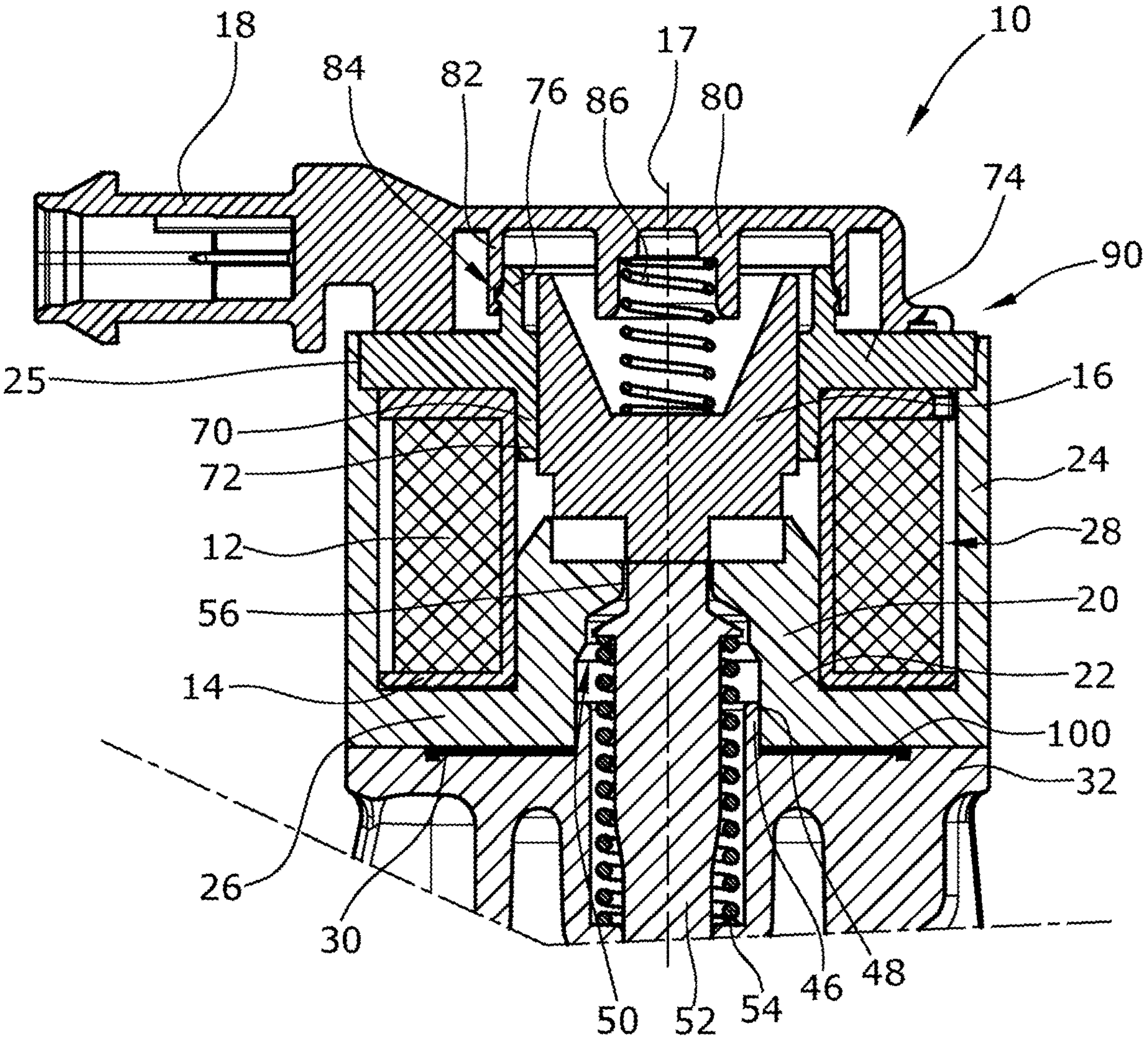
FIG. 2 shows a cross-section of a second version of an electromagnet configured according to the present invention.

The second embodiment of the electromagnet 10 shown in FIG. 2 differs only in an alternative attachment of the core 20 to the flow housing 32, wherein the core 20 is press-fitted to the flow housing 32 via the annular centering element 46 and the recess 48 and is adhesively bonded to the flow housing 32 via the axial contact surface 30. An adhesive layer 100 is provided between the contact surface 30 and the flow housing 32.

An electromagnet 10 is thereby created which comprises a reduced number of individual components and which can be assembled simply and inexpensively.

It should be clear that the scope of protection is not limited to the described embodiment examples, but that various modifications are possible within the scope of protection of the present invention. The core 20, the armature 16, or the guide element 70 could, for example, be configured differently. Reference should also be had to the appended claims.

LIST OF REFERENCE NUMERALS

10 Electromagnet
12 Coil
14 Coil carrier
16 Armature
17 Axial axis
18 Plug
20 Core
22 Cylindrical central portion
24 Annular protrusion
25 Annular shoulder

26 Connecting portion
28 Annular space
30 Contact surface
32 Flow housing
40 Through-hole(s)
42 Threaded hole(s)
44 Screw(s)
46 Annular centering element
48 Recess
50 Blind hole
52 Valve body
54 Spring
56 Aperture
70 Guide element
72 Sleeve
74 Mounting protrusion
76 Annular protrusion
80 Cover
82 Annular protrusion
84 Latching element
86 Compression spring
90 Pre-assembly unit
100 Adhesive layer

What is claimed is:

1. An electromagnet comprising:

a pre-assembly unit comprising a guide element and a coil;

an armature which is arranged translationally displaceable in the guide element; and a core comprising an axially extending annular protrusion into which the pre-assembly unit is inserted, wherein, the guide element comprises a sleeve and a mounting protrusion which extends radially from an outer peripheral surface of the sleeve, the sleeve comprises an inner circumferential surface which is configured to directly guide the axially movable armature, the mounting protrusion is attached to the axially extending annular protrusion of the core the pre-assembly unit further comprises a cover and a plug which is electrically connected to the coil, the cover is fixed to the guide element, the guide element is interlockingly fastened to the cover, the guide element comprises a protrusion which extends axially to the cover, the cover comprises a protrusion which extends axially to the guide element, and the protrusion of the guide element and the protrusion of the cover interlock with each other.

2. The electromagnet as recited in claim 1, wherein, the axially extending annular protrusion of the core comprises an inner peripheral surface which comprises an annular shoulder, and the guide element is axially in contact with the annular shoulder.

3. The electromagnet as recited in claim 1, wherein at least one of, the guide element comprises a guide surface which is coated with a nickel coating or with a zinc-nickel coating, and the armature comprises an outer circumferential surface which faces radially towards the guide element, the outer circumferential surface being coated with a nickel coating or with a zinc-nickel coating.

4. The electromagnet as recited in claim 1, wherein the plug is configured integrally with the cover.

5. The electromagnet as recited in claim 1, wherein the cover is interlockingly fastened or adhesively fastened attached to the guide element.

6. The electromagnet as recited in claim 1, wherein the pre-assembly unit further comprises the armature.

7. The electromagnet as recited in claim 1, wherein the pre-assembly unit further comprises a spring which is arranged between the cover and the armature.

8. An electromagnet comprising:

a pre-assembly unit comprising a guide element and a coil;

an armature which is arranged translationally displaceable in the guide element:

a core comprising an axially extending annular protrusion into which the pre-assembly unit is inserted; and a flow housing, wherein, the guide element comprises a sleeve and a mounting protrusion which extends radially from an outer peripheral surface of the sleeve, the sleeve comprises an inner circumferential surface which is configured to directly guide the axially movable armature, the mounting protrusion is attached to the axially extending annular protrusion of the core, the core further comprises a central cylindrical portion and a connecting portion which is disposed radially between the central cylindrical portion and the axially extending annular protrusion, and the connecting portion is at least one of pressed, screwed and adhesively bonded to the flow housing.

9. The electromagnet as recited in claim 8, wherein, the axially extending annular protrusion of the core comprises an inner peripheral surface which comprises an annular shoulder, and the guide element is axially in contact with the annular shoulder.

10. The electromagnet as recited in claim 8, wherein at least one of, the guide element comprises a guide surface which is coated with a nickel coating or with a zinc-nickel coating, and the armature comprises an outer circumferential surface which faces radially towards the guide element, the outer circumferential surface being coated with a nickel coating or with a zinc-nickel coating.

11. A method of mounting the electromagnet as recited in claim 10, the method comprising:

assembling at least one of the guide element, the coil, the armature, the plug, the cover, and the spring into the pre-assembly unit; and then inserting the pre-assembly unit into the axially extending annular protrusion of the core.

12. The method as recited in claim 11, further comprising:

at least one of screwing, pressing and adhesively bonding the core to the flow housing.

13. The method as recited in claim 11, further comprising:

attaching the pre-assembly unit to the core via a press-fit connection or an adhesive connection.

14. The electromagnet as recited in claim 8, wherein, the pre-assembly unit further comprises a cover and a plug which is electrically connected to the coil, and the cover is fixed to the guide element.

15. The electromagnet as recited in claim 14, wherein the plug is configured integrally with the cover.

16. The electromagnet as recited in claim 14, wherein the cover is interlockingly fastened or adhesively fastened attached to the guide element.

17. The electromagnet as recited in claim 14 wherein the pre-assembly unit further comprises the armature.

18. The electromagnet as recited in claim 14, wherein the pre-assembly unit further comprises a spring which is arranged between the cover and the armature.

19. The electromagnet as recited in claim 8, wherein, the core further comprises a centering recess thereon; and the flow housing comprises, on a side facing the core, a centering element which interacts with the centering recess provided on the core.

* * * * *